Sept. 4, 1923.

H. S. BERGEN
GRINDING MACHINE
Filed May 5, 1920

1,466,872

3 Sheets-Sheet 2

Inventor
Harry S. Bergen.
Miller Chindahl Parker
Attorneys.

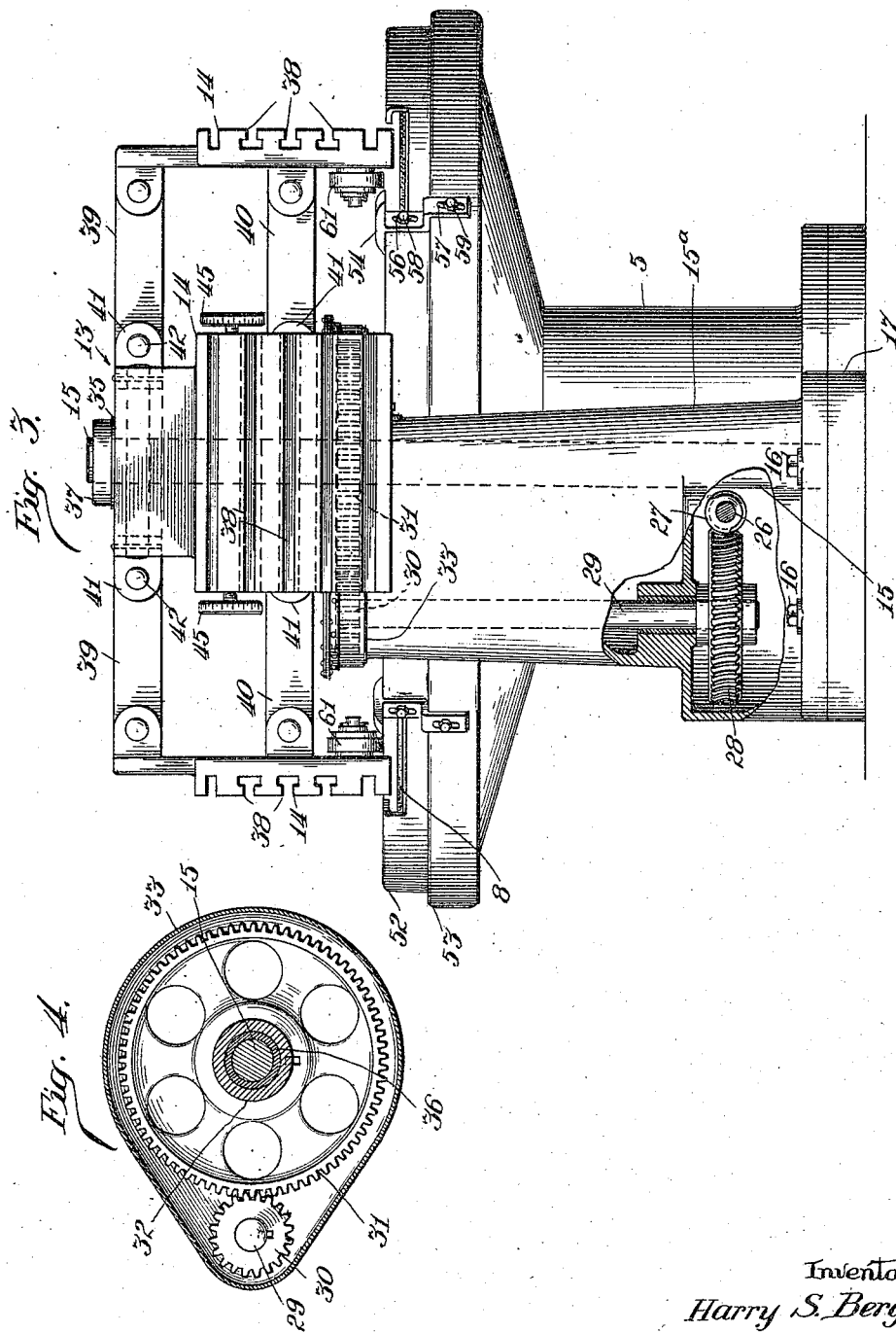

Patented Sept. 4, 1923.

1,466,872

UNITED STATES PATENT OFFICE.

HARRY S. BERGEN, OF TOLEDO, OHIO, ASSIGNOR TO GARDNER MACHINE COMPANY, OF SOUTH BELOIT, ILLINOIS, A CORPORATION OF ILLINOIS.

GRINDING MACHINE.

Application filed May 5, 1920. Serial No. 378,992.

*To all whom it may concern:*

Be it known that I, HARRY S. BERGEN, a citizen of the United States, residing at Toledo, county of Lucas, State of Ohio, have invented certain new and useful Improvements in Grinding Machines, of which the following is a specification.

My invention relates more particularly to machines of the so-called Gardner type in which the grinding element is a rotary horizontal table or disc covered with abrasive material to which the article to be ground is presented ordinarily by hand or by some form of holder or tool. My invention is particularly concerned with the means for presenting the work to the table. For this purpose I employ a rotary head carrying a plurality of work supports to which the articles to be ground are secured by suitable holders or tools successively, the continuing revolution of the head carrying the holders with the work applied thereto successively over the grinding table and lowering the work into contact therewith.

In the accompanying drawings I have shown and in the following specification describe a specific embodiment of my invention. It is to be understood, however, that the specific disclosure is for the purpose of exemplification only and that the scope of the invention is defined in the following claims in which I have endeavored to distinguish it from the prior art so far as known to me without however relinquishing or abandoning any portion or feature thereof.

Figure 1:
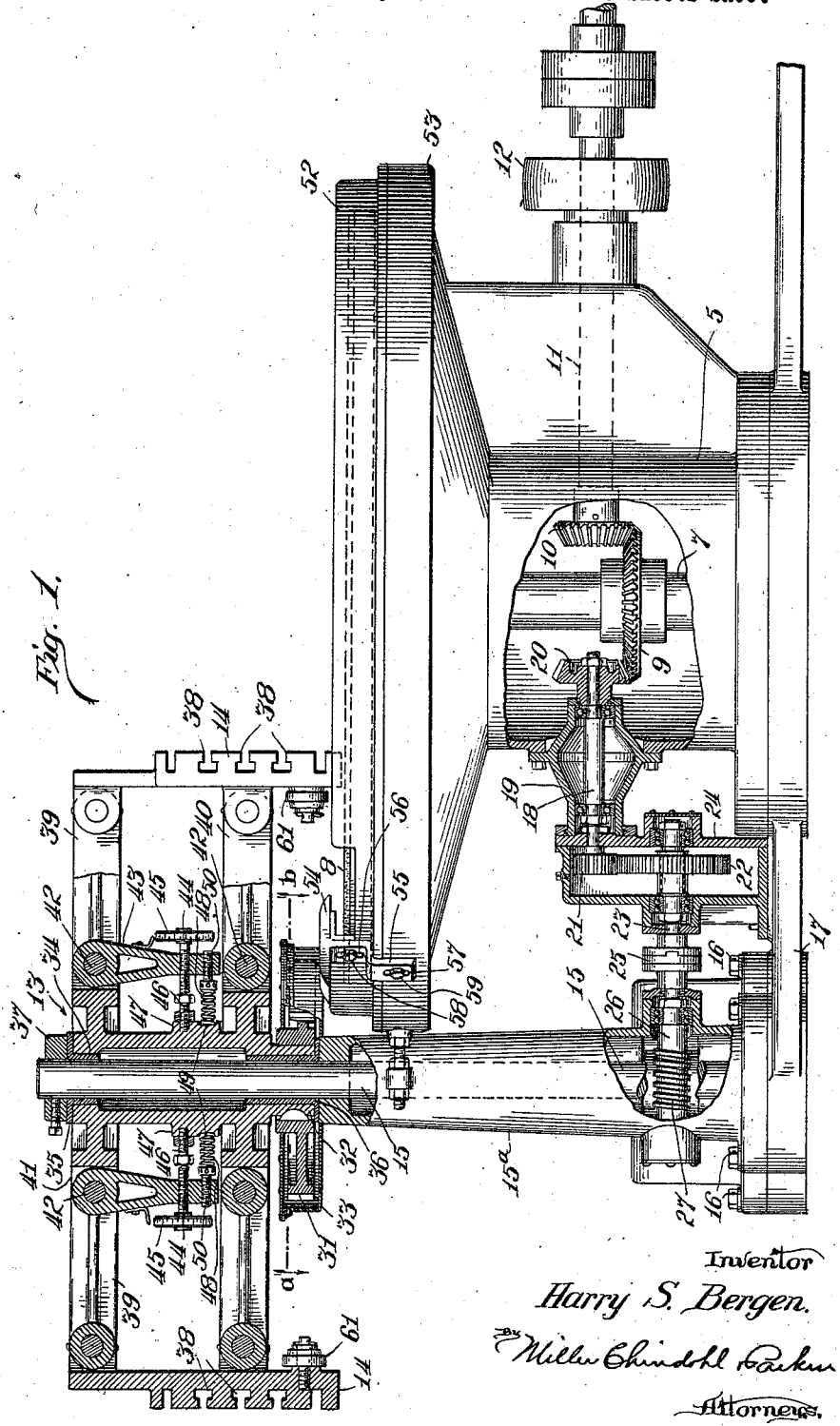
Figure 2:
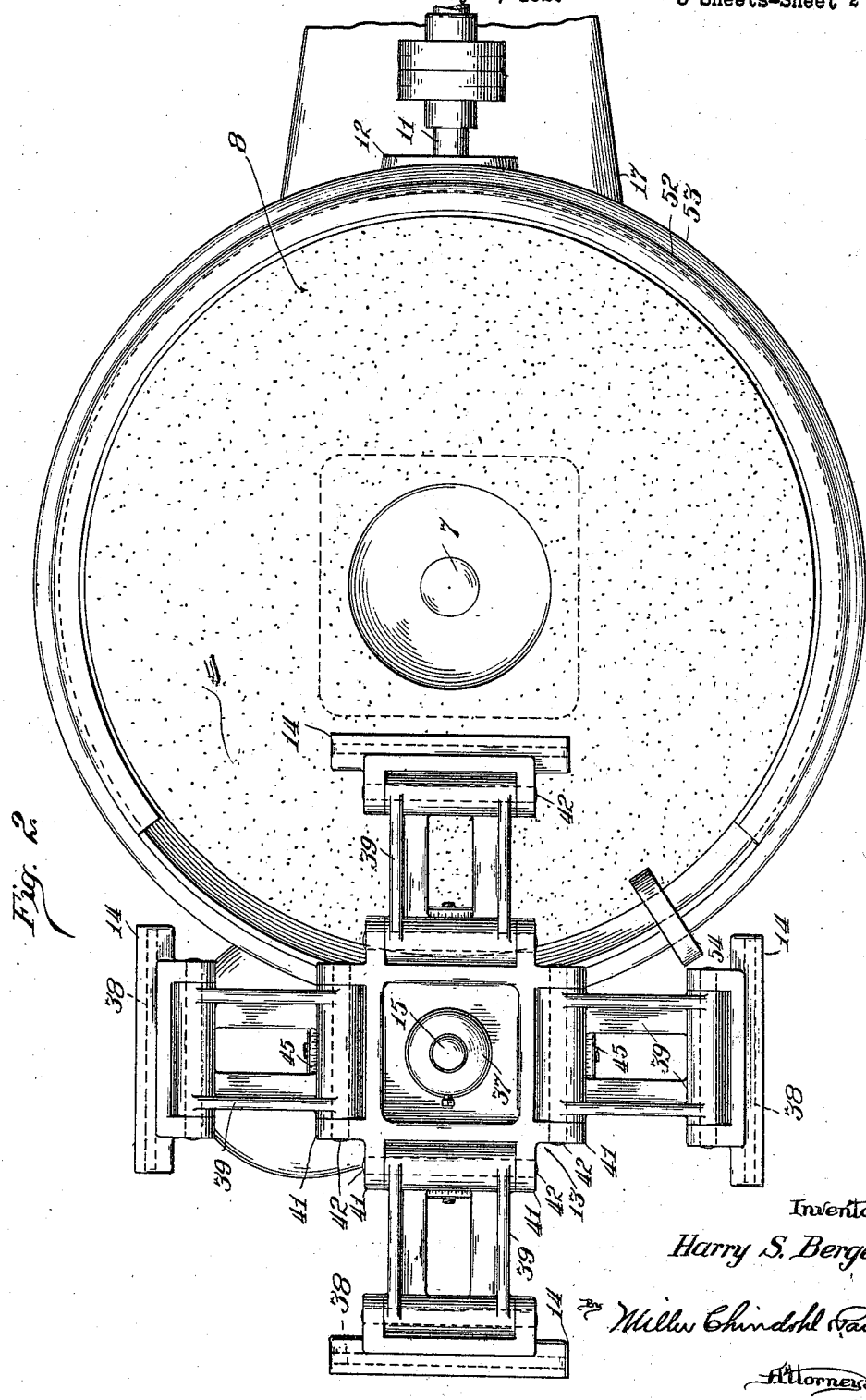

In the drawings Fig. 1 is a side elevation partly in vertical section of a grinding machine embodying my invention; Fig. 2 is a plan thereof partly broken away; Fig. 3 an end elevation on a plane at right angles to that of Fig. 1, partly broken away to show the interior construction, and Fig. 4 a horizontal section on the line *a—b* of Fig. 1 showing a detail.

Each part is identified by the same reference character wherever it occurs throughout the several views.

The grinding table proper may be of any usual or approved form. I have shown it as comprising a hollow standard or frame 5 in which is journaled the vertical shaft 7 on the upper end of which the grinding table or disc 8 is supported. Said shaft is provided with a beveled pinion 9 meshing with a similar pinion 10 upon a countershaft 11 which is driven in any usual or approved manner as for example by a pulley 12.

The rotary head 13 which carries the work supports 14 is journaled upon a shaft 15 secured in vertical position in a standard or column 15ª. Said standard or column is bolted or otherwise secured to an extension 17 of the base of the grinding table standard.

The work supporting head 13 may be driven in any suitable manner and I have shown in the drawings a satisfactory chain of gearing for driving it from the rotary shaft of the grinding table. For this purpose a countershaft 18 is mounted in a housing 19 secured in an opening in the column of the grinding table support, and said shaft 18 is provided at its inner end with a beveled pinion 20 meshing with the bevel gear 9 on the shaft of the grinding table. The other end of the countershaft is provided with a spur gear 21 which engages a spur gear 22 upon a short shaft 23 which is suitably journaled in a housing 24 which embraces also said spur gear 21. Shaft 23 is connected by a clutch 25 with a worm shaft 26 journaled in column 15ª, and the worm 27 of said worm shaft engages a worm wheel 28 upon the lower end of a vertical shaft 29 (see Fig. 3) upon the upper end of which is a spur gear 30. The last-mentioned gear engages and drives a spur gear 31 keyed or otherwise secured to a reduced neck 32 on the lower end of the casting head 13. It will thus be seen that the casting head or work supporting head is driven from the shaft of the grinding table but at a very low speed. Preferably the spurs 30, 31 are enclosed in a housing 33 (see Figs. 1 and 4).

The bore 34 of the rotary head 13 is preferably bushed at 35 and 36 where it bears upon the stationary shaft 15 and the latter is provided with a collar 37 suitably pinned thereto above the rotary head.

In the particular embodiment of my invention shown the head 13 is provided with four work supports 14 which are suitably grooved on their respective faces as at 38 to receive the attaching tools or devices for securing the work thereto. The work supports are pivoted to the ends of parallel-motion links 39, 40 which, at their inner ends are pivoted between pairs of ears 41 formed upon the rotary casting head 13, pins 42 extending through registering bores in said ears and the inner ends of the links for this purpose. The downward movement of the links carrying the work supports is limited by arms 43 formed upon the respective upper links 39, and the lower ends of said arms are perforated to receive adjusting screws 44. The screws 44 are provided with heads or turn wheels 45 for adjusting them and are adapted to bear against the heads of screw bolts 46 tapped into bosses 47 upon the body of the rotary head. Springs 48 are interposed between seats 49 on said bosses and the heads of adjustable screw bolts 50 in the lower ends of said arms, the purpose of this construction being to cushion the drop of the work onto the grinding table as will presently appear.

As shown in Fig. 1 the rotary grinding table is surrounded by a rim 52 upon the stationary frame or casing 53 which is supported by the hollow standard 5. When the work carriers or supports arrive at the table after having the work secured thereto it is necessary that they be raised to a height sufficient to clear this rim and then be lowered until the work comes in contact with the grinding table. For this purpose I provide a cam 54 which is adjustably bolted by its shank 55 to the casing 53, the shank being provided with slots 56, 57 through which bolts 58, 59 extend into the casing. Each of the work supports carries an anti-friction wheel 61 which is so mounted on said support as to engage the cam 54 as the work support to which it is connected approaches the rim 52. Roll 61 rides over the cam which is extended a sufficient distance over the rim to maintain the work support in an elevated position until the latter has cleared the rim. The roll then rides off the inclined end of the cam and the support with the attached work drops until the latter is in contact with the grinding table, the spring 48 serving to cushion the drop and ease the work into contact with the table.

The operation of my improved grinding machine is obvious. The grinding table is driven at a suitable rate of speed and the work supporting head is driven slowly from the grinding table by the chain of reducing gear heretofore described. The revolution of the work supporting head is sufficiently slow to permit the work readily to be secured to the work supports and this is performed by the machine operative as the supports successively arrive in suitable or convenient positions. The continued rotation of the head brings the supports successively adjacent the table when the cams, operating on the rollers, raise the supports, maintain them until they have cleared the rim and then permit them to descend until the work is in contact with the grinding table. When each piece of work has been sufficiently ground it is removed from the work support and from the grinding table.

I claim:

1. In a grinding machine, the combination with a grinding table, of a rotary head, a series of work supports on said head, means for rotating said head to carry the supports toward and away from said grinding table, said supports when away from said grinding table being entirely supported by said head, means for taking up the weight of said supports when they reach and when they leave said table, said supports when over said table being free to be drawn by gravity toward the table whereby work thereon will be presented to the table for grinding.

2. In combination with a grinding machine having a rotary grinding wheel and a stationary guard rim surrounding said wheel, a work carrier mounted to travel in an endless path and also to move in a plane perpendicular to the plane of such path, and means for effecting such perpendicular movement when the carrier is adjacent to said rim.

3. In a grinding machine and in combination with the grinding table thereof, a rotary head, a series of work supports carried by said head, connections between said head and work supports providing a vertical movement for the latter and means for raising the work supports adjacent the edge of the table and permitting them to drop into operative relation to the table after passing the edge thereof.

4. In a grinding machine and in combination with the grinding table thereof, a rotary head mounted for rotation about a vertical axis adjacent the table, a series of work supports mounted on the head and carried thereby from a position remote from the table to a position over the table, connections from the work support to the head permitting a vertical movement of the supports and a cam adjacent the edge of the table and in the path of the supports to guide the latter over the edge of the table and permit them to fall into operative relation to the table after passing the edge thereof.

5. In a grinding machine and in combination with the grinding table thereof, a rotary head, a series of work supports carried thereby, pivoted links connecting the work supports and the head and affording vertical movement for the supports and a cam adjacent the edge of the table and engaging the supports as they are carried over the edge of the table to maintain them during such movement above the edge of the table and permit them to drop into operative relation to the table.

6. In a grinding machine, the combination with a grinding table, a rotary head mounted on a vertical axis adjacent the table, a series of work supports mounted on the head, links pivoted to the head and to the respective work supports to permit vertical movement of the latter, and cams in the path of the supports for guiding them to and from grinding position over said table.

7. In a grinding machine and in combination with the grinding table, a head journaled upon a vertical axis adjacent the table, pairs of links pivoted on horizontal axes to the head, work supports pivoted to the respective pairs of links, and a cam arranged in the path of the work supports for guiding them over the edge of the table and permitting them to fall into operative relation thereto.

8. In a grinding machine and in combination with a grinding table, a rotary head mounted upon a vertical axis adjacent the table, a series of work supports, parallel motion links connecting said work supports to the head for vertical movement, and a cam arranged in the path of the work supports adjacent the edge of the table for raising said supports above the latter and permitting them to fall into operative relation to the table.

9. In a grinding machine and in combination with the grinding table thereof, a rotary head mounted on a vertical axis adjacent the grinding table, a series of work supports, pairs of parallel motion links connecting the respective work supports to the head, an arm on one of the links of each pair, adjustable means on the arm for limiting the downward movement of the work support and a cam arranged in the path of the work supports for raising the latter over the edge of the grinding table and permitting them to fall into operative relation to the table.

10. In a grinding machine and in combination with the grinding table thereof, a rotary head mounted on a vertical axis adjacent the table, pairs of parallel motion links connected to the head, a work support carried by the parallel motion links, an arm connected to one of each pair of parallel motion links, a set screw in the arm adapted to engage an abutment on the head to limit the downward movement of the work support, and a cam in the path of the work supports adjacent the edge of the grinding table and adapted to guide the supports over the edge of the table.

11. In a grinding machine and in combination with the grinding table thereof, a rotary head mounted on a vertical axis adjacent the table, pairs of parallel motion links connected to the head, a work support carried by the parallel motion links, an arm connected to one of each pair of parallel motion links, a spring adapted to engage the arm, and a cam in the path of the work supports adjacent the edge of the grinding table and adapted to guide the supports over the edge of the table.

12. In a grinding machine and in combination with the grinding table, a rotary head journaled on a vertical axis adjacent the table, pairs of parallel motion links pivoted to the head, work supports carried by the respective pairs of the parallel motion links, an arm connected to a link of each pair, a stop for limiting the inward movement of the arm, a spring for engaging and cushioning the inward movement of the arm, and a cam arranged in the path of rotation of the supports and adapted to guide them over the edge of the table.

13. In a grinding machine and in combination with the grinding table thereof, a rotary head mounted on a vertical axis adjacent the table, reducing gearing intermediate said table and head for rotating the latter at a relatively slow speed, work supports carried by the head, connections between said work supports and head permitting a vertical movement of the respective supports, and a cam arranged in the path of movement of the supports and adapted to raise the same adjacent the edge of the table and permit them to fall into operative relation to the surface of the table.

14. In a grinding machine, the combination with a grinding table, of a rotary head mounted upon a vertical axis adjacent the table, a series of work supports, parallel motion links connecting said work supports to the head for vertical movement, and means for guiding said supports to and from said table.

15. In a grinding machine, the combination with a grinding table, of a supporting frame, a series of work holders connected with said frame and free to move vertically, means for moving said frame to carry said holders toward and away from a position over said table, said work holders when away from said table being down so that work secured thereto is below the grinding face of the grinding table, and means operating automatically during travel of said holders toward said table to raise said holders to permit work thereon to be brought over the table, said holders when over the table being released so they may present the work to the table for grinding.

16. In a grinding machine, the combination with a grinding table, of a supporting frame, a series of work holders connected with said frame and free to move vertically, means for moving said frame to carry said holders toward and away from a position over said table, said work holders when away from said table being down so that work secured thereto is below the grinding face of the grinding table, means operating automatically during travel of said holders toward said table to raise said holders to permit work thereon to be brought over the table, said holders when over the table being released so they may present the work to the table for grinding, and means operating automatically for raising the holders when they leave the table after a grinding operation.

17. In a grinding machine, the combination of a grinding table, a plurality of work holders, means for moving said work holders successively over and across a section of said grinding table, and means in the path of said holders for raising them just before they are brought over the table and to release them when over the table whereby work secured on the holders may be presented to the table for grinding.

18. In a grinding machine, the combination with a grinding table, of a plurality of work holders, means for moving said work holders successively over and across the table, and means in the path of said holders for raising them just before they reach and leave the table, said holders being free from said raising means when over the table whereby work secured thereto may be presented to the table for grinding.

19. In a grinding machine, the combination with a grinding table, a supporting frame adjacent said table, a plurality of work holders connected with said frame to travel therewith and to move vertically, abutments on said frame for said work holders, means for moving said frame to cause said work holders to be carried over and across the grinding table, said work holders when away from said table being supported by said abutments whereby work on the holders will be below the grinding face of the table a distance determined by the amount of grinding desired, and means for cooperating with said holders just before they reach the table to raise said holders to permit the work thereon to be brought into position over the table, said holders when in position over the table being free to move downwardly to present the work thereon to the table for grinding.

20. In a grinding machine, the combination with a grinding table, a supporting frame adjacent said table, a plurality of work holders connected with said frame to travel therewith and to move vertically, abutments on said frame for said work holders, means for moving said frame to cause said work holders to be carried over and across the grinding table, said work holders when away from said table being supported by said abutments whereby work on the holders will be below the grinding face of the table a distance determined by the amount of grinding desired, means for cooperating with said holders just before they reach the table to raise said holders to permit the work thereon to be brought into position over the table, said holders when in position over the table being free to move downwardly to present the work thereon to the table for grinding, and means for cushioning the downward movement of said holders when over the table.

21. In a grinding machine, the combination of a grinding table, a frame, a plurality of work holders connected with said frame to travel therewith and being adapted to move vertically, means for moving said frame to carry said holders successively across a section of the grinding table, said holders when away from said table being in a lower position whereby work secured thereto will have its presented face below the grinding plane of the grinding table, means for elevating the holders as they reach the table whereby the work thereon will be raised above the grinding plane, said holders being free when over the grinding table to drop, shock absorber springs for cushioning the drop of the holders and the application of the work to the table, and means for positively limiting the downward movement of the work holder and thereby the amount of grinding on work supported thereby.

22. In a grinding machine, the combination of a grinding table, a frame adjacent said table, a work holder hinged to said frame to swing vertically, means for moving said frame to carry said work holder over and across the grinding table, adjustable abutments between said frame and holder, said abutments taking up the weight of the holders when the holder is away from the table whereby work supported on the holder will be projected below the grinding plane of the grinding table, and means for raising the holder before it comes into position over the table and for releasing it when in such position whereby the holder may drop to present the work thereon to the table for grinding, said abutments limiting the downward movement of the holder and thereby the amount of grinding.

23. In a grinding machine, the combination of a horizontally rotatable grinding table, a frame adjacent said table, a work holder hinged to said table to swing vertically, abutments between said frame and holder, means for moving said frame to carry said holder over and across the grinding table, said abutments supporting said holder when away from the table whereby work secured thereto will be projected below the grinding face of the grinding table, means for raising the holder before it comes over the table to raise the work thereon above the grinding face of the table, said holder being released from said raising means when over the table, and a shock absorber spring for cushioning the downward movement of said holder, the weight of said holder overcoming said springs to press the work against the table during grinding thereof, said abutments limiting the downward movement of said holder and thereby the amount of grinding.

24. In a grinding machine, the combination of a horizontal grinding table, work holder mechanism, means for bodily moving said holder mechanism toward and across the table, and means in the path of the holder mechanism for lifting it to raise work thereon above the grinding plane of the table and releasing the holder mechanism when over the table to permit it to apply the work to the table for grinding.

25. A grinding machine having in combination, a rotary grinding wheel, a carrier rotatably mounted on an axis which is parallel with the axis of said wheel and is located beyond the edge of said wheel, means for driving said wheel and said carrier, a plurality of work holders mounted on said carrier to travel therewith in an endless path, and means for successively effecting the movements of said work holders first toward the grinding wheel as the work holders arrive opposite the grinding face, and then away from the grinding wheel as the work holders leave the grinding face.

26. A grinding machine having, in combination, a grinding wheel and a work carrier mounted on parallel axes, a plurality of work holders mounted on said carrier to travel therewith in an endless path across the grinding face of said wheel, and means for successively effecting the approaching and receding movements of said work carriers with respect to the face of said grinding wheel as the work carriers arrive opposite and leave such grinding face respectively.

27. A grinding machine having, in combination, a grinding element and driving means therefor, a plurality of work holders, means for moving said work holders successively across the grinding face of said element, and means for effecting an approaching movement of each work holder toward such grinding face as the work holder comes opposite such face, and for effecting a receding movement of each work holder from said grinding face as the work holder is about to move off from the grinding element.

28. In combination with a grinder having a horizontal grinding table mounted to rotate on a vertical axis and also having a rim peripherally surrounding said grinding table, a rotary structure mounted on a vertical axis at one side of said table and carrying a plurality of work supports, each support being arranged to have a movement up and down with relation to the remainder of said structure, and means for consecutively causing such up and down motion of said supports when adjacent to said rim.

29. In combination with a grinder having a rotary grinding wheel with a grinding surface on one side thereof, a work carrying structure mounted on an axis beyond the edge of said wheel and comprising a central portion, a work-support, and two parallel links projecting radially from said central portion, each link being pivoted at one end to said central portion and at its opposite end to said work support.

30. A grinding machine having, in combination, a rotary grinding wheel having its grinding face on one side of the wheel, a rotary work supporting structure mounted on an axis parallel to the axis of said wheel and located beyond the periphery of the wheel, said structure comprising a central portion, a plurality of work-supports disposed peripherally about the structure, and a plurality of pairs of parallel links projecting radially from said central portion, each pair of links supporting one of said work supports, the links of each pair being pivoted at one end to said central portion and at their other ends to one of said work supports.

31. A grinding machine having, in combination, a rotary grinding wheel and a work carrier mounted on parallel vertical axes, the axis of the work carrier being located beyond the periphery of said wheel, a plurality of work holders mounted on said carrier to travel therewith over the face of said wheel, said work holders being free to descend by gravity when above said wheel to allow the work in said holders to rest on the grinding face of the wheel, and cam means for successively raising said holders as they move off one peripheral portion of said wheel and for permitting the descent of said holders as they approach another peripheral portion of said wheel.

32. A grinding machine having, in combination, a rotary grinding wheel and a work carrier mounted on parallel vertical axes, the axis of the work carrier being located beyond the periphery of said wheel, a plurality of work holders mounted on said carrier to travel therewith over the face of said wheel, said work holders being free to descend by gravity when above said wheel to allow the work in said holder to rest on the grinding face of the wheel, cam means for successively raising said holders as they move off one peripheral portion of said wheel and for permitting the descent of said holders as they approach another peripheral portion of said wheel, and stop means adapted to be adjusted to different fixed positions for determining the lowermost position of said work holders.

33. A grinding machine having, in combination, a rotary grinding wheel and a work carrier mounted on parallel vertical axes, the axis of the work carrier being located beyond the periphery of said wheel, a plurality of work holders mounted on said carrier to travel therewith over the face of said wheel, said work holders being free to descend by gravity when above said wheel to allow the work in said holder to rest on the grinding face of the wheel, means for successively raising said holders as they move off one peripheral portion of said wheel and for permitting the descent of said holders as they approach another peripheral portion of said wheel, stop means adapted to be adjusted to different fixed positions for determining the lowermost position of said work holders, and yieldable stop means for each work holder arranged to come into play before the first mentioned stop means acts.

34. A work carrier for grinding machines comprising a central portion mounted to rotate on a vertical axis, a plurality of pairs of parallel links projecting radially from said central portion, the links of each pair being positioned one above the other and being pivoted at their inner ends to said central portion, a plurality of work supports each of which is pivotally connected to the outer ends of one of said pairs of links, and means for adjustably limiting the downward movement of said links.

35. A rotary work carrier for grinding machines comprising a central head, a plurality of work holders, a plurality of pairs of parallel links each pair adjoining one of said work holders to said head, a plurality of stops carried by said head, one for each work holder, and a plurality of stops each arranged to move with one of said work holders and to cooperate with one of the first mentioned stops for limiting the movement of its work holder in one direction.

HARRY S. BERGEN.